(No Model.) 2 Sheets—Sheet 1.

J. L. HEALD.
Grape Elevator, Crusher and Stemmer.

No. 242,640. Patented June 7, 1881.

Witnesses,
Geo. H. Strong.
Frank A. Brooks.

Inventor,
John L. Heald
By Dewey & Co. Att'ys (No Model.) 2 Sheets—Sheet 2.

J. L. HEALD.
Grape Elevator, Crusher and Stemmer.

No. 242,640. Patented June 7, 1881.

Witnesses,
Geo. H. Strong.
Frank A. Brooks

Inventor,
John L. Heald
By Dewey & Co.
Attys

UNITED STATES PATENT OFFICE.

JOHN L. HEALD, OF VALLEJO, CALIFORNIA.

GRAPE ELEVATOR, CRUSHER, AND STEMMER.

SPECIFICATION forming part of Letters Patent No. 242,640, dated June 7, 1881.

Application filed March 26, 1881. (No model.)

*To all whom it may concern:*

Be it known that I, JOHN L. HEALD, of Vallejo, county of Solano, State of California, have invented a Grape Elevator, Crusher, and Stemmer; and I hereby declare the following to be a full, clear, and exact description thereof.

My invention relates to a novel apparatus which is principally useful in preparing grapes for wine-making; and it consists of a pair of corrugated or fluted crushing-rollers which run together and are driven by suitable gearing, these rollers being provided with an attachment by which they are separated and thrown out of gear whenever any hard substance or body which would injure them passes through. Below these rollers is a cylindrical case having its lower part perforated with holes and having a shaft extending longitudinally through it. This shaft has radial arms attached to it, so as to form a spiral extending from end to end, the object of which is to press the grape-pomace through the perforated bottom of the cylinder, and to carry the stems and worthless portion out at the end of the cylinder. Below this cylinder is an inclined grating, upon which the pomace falls, and from the lower end of which it is delivered into the cars to be carried to the press, a hinged movable gate controlling its discharge. The grapes, either loose or in boxes, are placed upon a peculiarly-constructed elevator, the whole forming an apparatus which will be more fully explained by reference to the accompanying drawings, in which—

Figure 1:
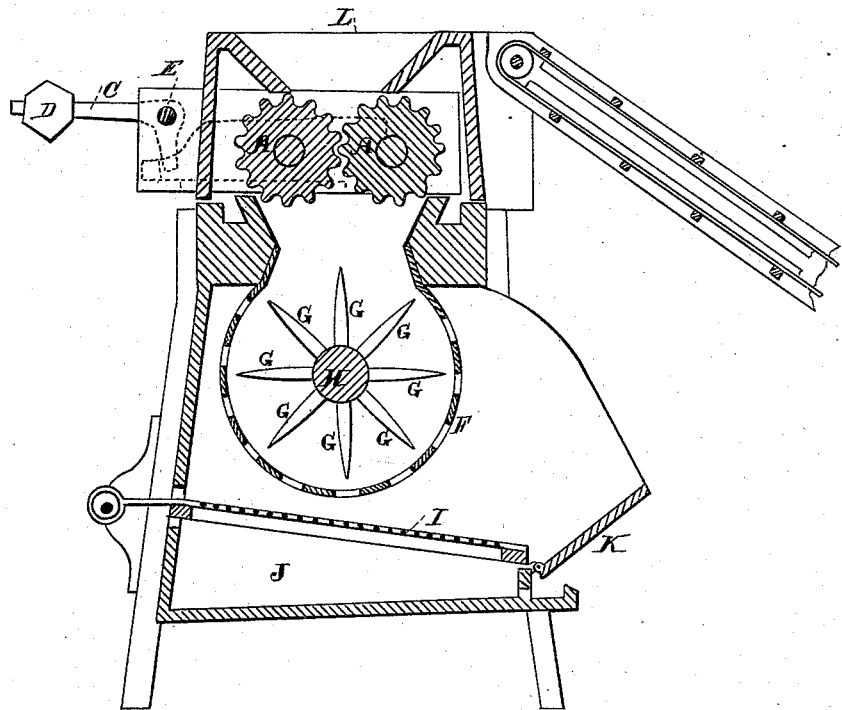
Figure 2:
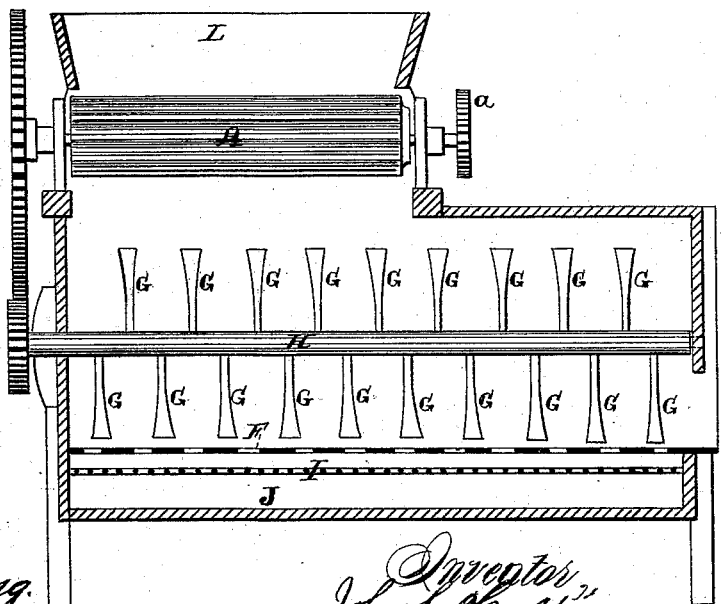
Figure 3:
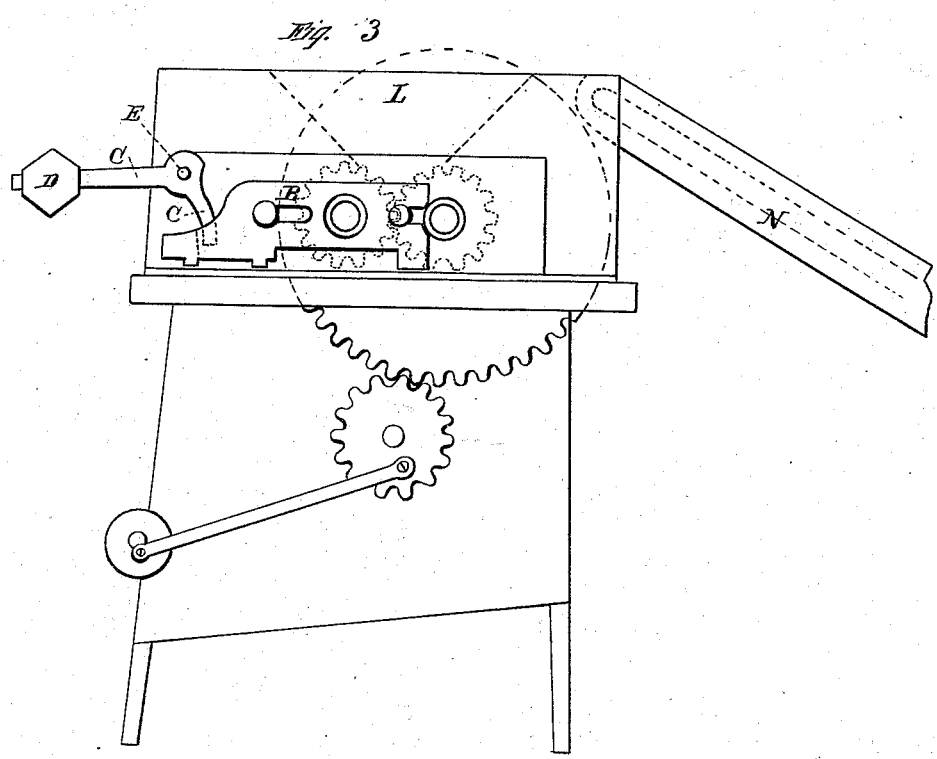
Figure 4:
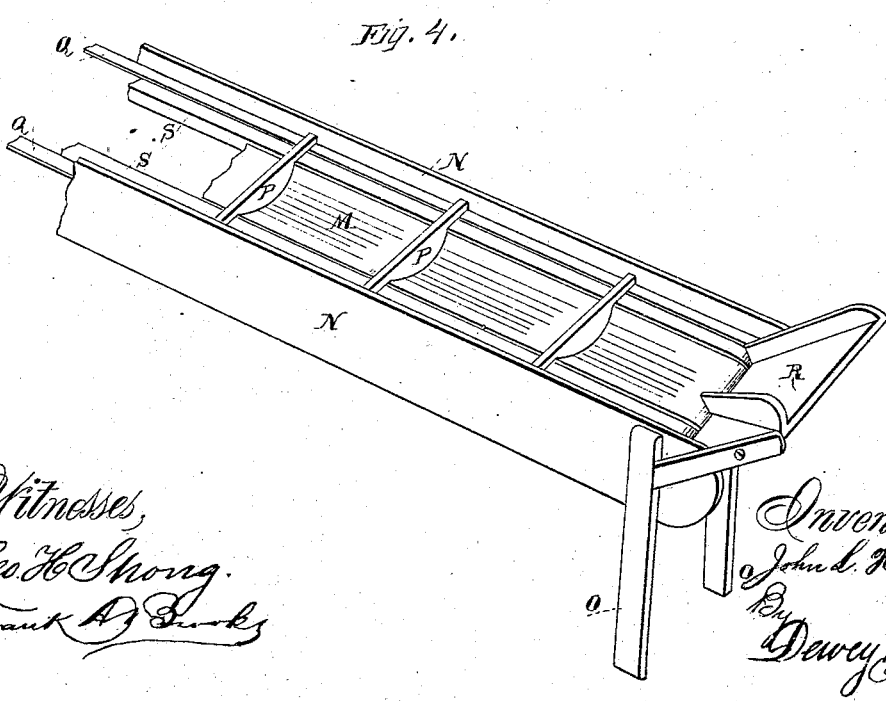

Figure 1 is a view of my apparatus, showing a vertical section transverse to the rollers. Fig. 2 is a longitudinal vertical section. Fig. 3 is an end elevation, showing the roller-adjusting mechanism. Fig. 4 is a view of the elevator.

A A are two fluted rollers, of a length and diameter sufficient for the work to be done. These rollers are supported to turn on shafts in suitable boxes, so that the elevation of one roller will fit the depression of the other, and they will thus crush or macerate any soft material which passes between them. The driving-pulley, crank, or other mechanism may be secured to one end of one of the shafts. The opposite ends of the two shafts are connected by spur-gear wheels $a$, having the same number of teeth that there are corrugations in the rollers, for a purpose to be hereinafter described.

It often happens that stones and other hard substances are gathered and discharged into the hopper with the grapes, and if these were allowed to pass between unyielding rollers the latter would be broken, or their axles bent or thrown out of place. In order to allow my crusher to adjust itself to such contingencies, I mount the boxes of the journals of one of the rollers upon slides B, which move horizontally on suitable guides, so that they and the roller supported by them may be moved back when desired. Bell-crank or angular levers C have their fulcrums above these guides, and while the short arms of the levers connect with the slides the long arms project nearly horizontally backward and have weights D attached to them. These weights serve to force and hold the crushing-rollers in contact against the ordinary pressure of the grapes which are passing through, but if a stone or other hard substance enters between the rollers it will overcome this resistance and lift the weights, thus allowing the journals and rollers to move back, so that the stone can pass without injury to the rollers. As soon as it has passed the rollers will be instantly thrown forward into place again, and as the gear-wheels have the same number of teeth as the rollers it will be seen that they will always fall into place and mesh with each other, whatever the change in their relative position which may have taken place while they were separated.

It is necessary that the movable roller should move back in a line parallel with the permanent roller, and to effect this the weighted arms C have a shaft, E, passing through their angles and serving as a fulcrum, while at the same time uniting them rigidly, so that one moves with the other; and if a hard substance should pass between the rollers at their extreme ends the effect would be to separate them equally for their whole length, and they will come together in like manner.

After passing between the rollers and becoming crushed, the grapes, with their stems, fall into a horizontal hollow cylinder, F, below the crushers. This cylinder has the lower half formed with perforations, through which the pomace is forced by means of a series of arms, G, projecting from a shaft, H, passing longitudinally through its center. These arms are so fixed in the shaft that they form a spiral around it from one end to the other, so that when the shaft is rotated the arms, in addition to forcing the pomace through the perforations in the bottom of the cylinder, also separate the stems, and by their spiral motion gradually carry them outward until they are discharged from the end of the cylinder, while the pomace, entirely clear of stems, falls through the bottom of the cylinder upon an inclined grating or shaking-screen, I, beneath the cylinder.

A receptacle, J, beneath this grating or screen receives the juice which drips from it, while the screen directs the pomace toward the front, where it is discharged into cars, which transport it to the press. The screen is preferably given a shaking motion, which causes the soft jelly-like mass of pomace to spread out and allow the juice or must to run out more freely, which leaves the remainder in a better condition for pressing and gives more of the white wine.

A gate, K, is hinged to the lower or front edge of the grating or screen, and when no cans are ready to receive the material from the screen this gate may be turned up and thus hold it until another car is brought up.

The shaft H projects out through the end of the cylinder F, and is driven by means of a belt or gear-wheel, which receives its motion from the wheel upon the shaft of one of the crushing-rollers, or by any suitable connection.

The grapes are elevated to the feed-hopper L, by which the crushing-rollers are supplied, or to the floor, from which they are fed into the hopper by means of a carrying-belt, M, the frame N of which has its lower end supported by legs O, while the upper end rests upon the edge of the platform, floor, or hopper. The belt M has its center made slightly concave by means of the cross strips or slats P, which have the surface to which the belt is fixed made convex, as shown. The ends of these slats are extended beyond the belt, and are secured to the rubber or leather belts Q, by which the central belt is carried. These exterior belts run over suitable drums or pulleys at each end of the frame, and by means of the cross-slats they carry the central belt, while they are at the same time kept out of contact with the juice, which would soon damage or destroy them. The central carrying-belt, by being concaved, receives and holds loose grapes, and any juice which exudes from broken or crushed grapes will be held in the center of the belt.

The chute R, by which the grapes are fed upon the belt, is pivoted to the lower end of the frame, so that its angle is adjustable, and by this construction the feed is regulated to suit the capacity of the crushing-rollers. If desired, the grapes may be elevated to the floor or platform in boxes, as when picked in the hot part of the day, and used after becoming cool.

To support the boxes or loose grapes in masses and prevent the belt from sagging, longitudinal strips S extend up between the sides of the frame N, lying just between the central belt or carrier M and the belt Q. As the cross-slats P rest upon these the belt will be supported, and when boxes are elevated they rest and slide upon these strips, which act as rails for them to travel upon.

In some cases it will be found useful to remove the crushing apparatus from the remainder of the machine, which can be easily done at any time.

Having thus described my invention, what I claim as new, and desire to secure by Letters Patent, is—

1. In a grape-crushing device, the combination of the crushing-rollers, adapted to separate sidewise and to return automatically to a normal position, the perforated cylinder, the shaft having spirally arranged-teeth and adapted to revolve within said cylinder, and the inclined screen I, situated below the said cylinder.

2. The fluted crushing-rolls A, perforated stemming-cylinder F, with its spirally-moving arms G, the inclined grating or screen I, adjustable gate K, and the receiver J, substantially as herein described.

3. In a grape crushing and stemming apparatus, the elevator consisting of the exterior belts, Q, united with the central carrying-belt, M, by transverse slats P, so that the belts may be separated from the carrier and preserved from injury by the grape-juice, as herein described.

4. The elevating carrying-belt M, driven from the belts Q by the transverse slats P, these slats having a convex surface where the belt M is attached, substantially as and for the purpose herein described.

5. In a grape elevating, crushing, and stemming apparatus, the elevator consisting of the exterior driving-belts, Q, and the central carrying-belt, M, with the cross strips or slats P, in combination with the frame having the rails or strips S lying parallel with and between the edges of the belts, substantially as and for the purpose herein described.

In witness whereof I have hereunto set my hand.

JOHN L. HEALD.

Witnesses:
S. H. NOURSE,
FRANK A. BROOKS.